US008369882B1

(12) United States Patent
Manroa et al.

(10) Patent No.: US 8,369,882 B1
(45) Date of Patent: Feb. 5, 2013

(54) SYSTEMS AND METHODS FOR SETTING-UP GROUP CALLS BASED ON A GROUP CALL REQUEST

(75) Inventors: Arun Manroa, Herndon, VA (US); Zheng Cai, Fairfax, VA (US)

(73) Assignee: Nextel Communications Inc., Reston, VA (US)

( * ) Notice: Subject to any disclaimer, the term of this patent is extended or adjusted under 35 U.S.C. 154(b) by 1230 days.

(21) Appl. No.: 12/177,324

(22) Filed: Jul. 22, 2008

(51) Int. Cl.
*H04W 4/08* (2009.01)
*H04W 4/10* (2009.01)

(52) U.S. Cl. .................................................. 455/519

(58) Field of Classification Search .................. None
See application file for complete search history.

(56) References Cited

U.S. PATENT DOCUMENTS

2006/0251050 A1* 11/2006 Karlsson ........................ 370/352

* cited by examiner

*Primary Examiner* — Philip Sobutka

(57) ABSTRACT

Systems and methods for establishing a push-to-talk (PTT) call are provided. When a group call request that identifies a first and second destination mobile station is received from an originating mobile station, a location of the first destination mobile station is determined. The call is established between the originating mobile station and the first destination mobile station prior to a determination of a location of the second destination mobile station. When the group call involves mobile stations of two different networks, a gateway of the second network sends an acknowledgement message accepting the call to a gateway of the first network and the gateway of the second network receives an acknowledgement message accepting the call from the first destination mobile station. The acknowledgement message is received from the first destination mobile station subsequent to the sending of the acknowledgement message from the second gateway to the first gateway.

17 Claims, 2 Drawing Sheets

SYSTEMS AND METHODS FOR SETTING-UP GROUP CALLS BASED ON A GROUP CALL REQUEST

BACKGROUND OF THE INVENTION

Figure 1:
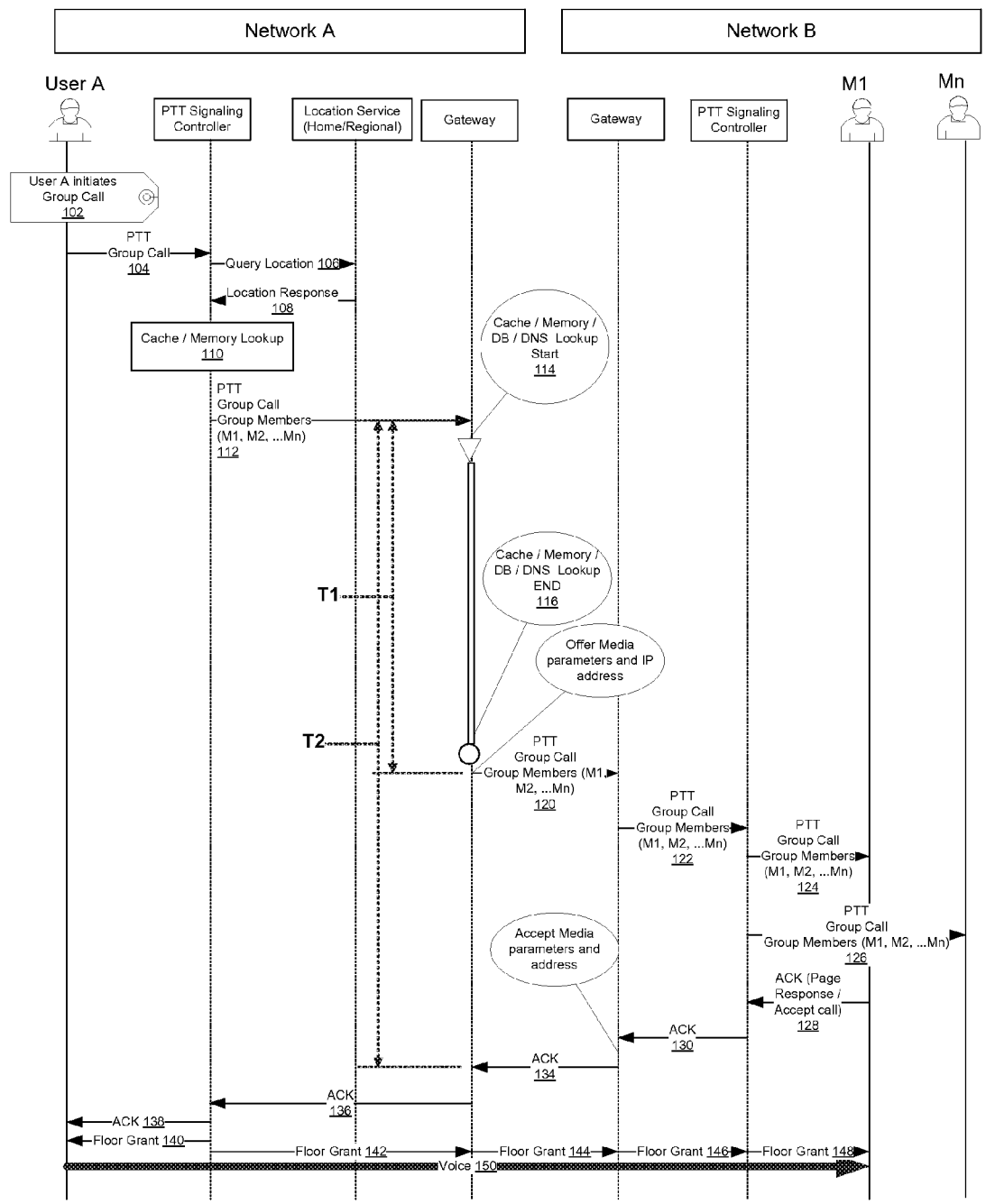

Wireless communication networks typically provide a number of different services, such a voice and data communication services. Most wireless communication networks typically offer a single type of voice communication service, interconnect voice communication services (also referred to as circuit-switched voice communication services). Interconnect voice communication services provide a full-duplex communication between two communication endpoints.

Another type of voice communication service is push-to-talk voice communication services (also referred to as dispatch communication services), which involve a half-duplex communication between two communication endpoints. Thus, a push-to-talk call requires floor control to ensure that only one endpoint has permission to talk at any particular time during the call. There are three basic types of push-to-talk calls, call alerts, private calls and group calls. Call alerts merely inform the caller whether the called party is available for a call, but no voice channel is established. Private calls involve establishing a voice channel between two endpoints, whereas group calls involve establishing a voice channel between more than two endpoints.

Push-to-talk communication services have historically been employed in private wireless communication networks by, for example, taxi cab companies or emergency service agencies (e.g., police and fire departments). Until recently, the only type of public wireless communication network that supported push-to-talk calls was the iDEN network, such as the one owned and operated by Sprint Nextel Corporation.

One of the most recognized advantages of push-to-talk calls compared to interconnect calls is the fast call setup time. For example, push-to-talk calls are typically setup in under 1 second, whereas interconnect calls may not even begin to ring the called party in this time. Private wireless communication networks and the iDEN network are able to provide push-to-talk calls with a fast setup time because these networks are specifically designed to provide these types of calls. Moreover, due to the proprietary nature in which push-to-talk calls are implemented to satisfy this fast setup time, push-to-talk calls typically are not performed between different wireless communication networks.

SUMMARY OF THE INVENTION

It has been recognized that push-to-talk group calls between mobile stations of different networks may not be able to provide the fast setup time that is expected by those accustomed to push-to-talk calls within a private wireless communication network or within the iDEN network. Accordingly, exemplary embodiments of the present invention provide systems and methods for fast setup time for calls between mobile stations supported by different networks.

Exemplary embodiments of the present invention provide systems and methods for establishing a call. When a group call request that identifies a first and second destination mobile station is received from an originating mobile station, a location of the first destination mobile station is determined. The call is established between the originating mobile station and the first destination mobile station prior to a determination of a location of the second destination mobile station.

In accordance with another aspect of the present invention, systems and methods for establishing a call between an originating mobile station supported by a first network and at least a first destination mobile station supported by a second network are provided. A gateway of the second network receives a group call request that identifies the first destination mobile station and includes media parameters for a group call. The gateway of the second network sends the group call request to the first destination mobile station. The gateway of the second network sends an acknowledgement message, accepting the call and media parameters, to a gateway of the first network. The gateway of the second network receives an acknowledgement message accepting the call from the first destination mobile station. The acknowledgement message is received from the first destination mobile station subsequent to the sending of the acknowledgement message from the second gateway to the first gateway. A call is then established between the originating mobile station and the first destination mobile station. Once the session is established, the gateway of the first network updates the group call session by adding more destination mobile stations to the session. This multi-tiered approach to setting-up the session across the networks reduces the latency of the group call setup procedure.

Other objects, advantages and novel features of the present invention will become apparent from the following detailed description of the invention when considered in conjunction with the accompanying drawings.

BRIEF DESCRIPTION OF THE DRAWING FIGURES

Figure 2:
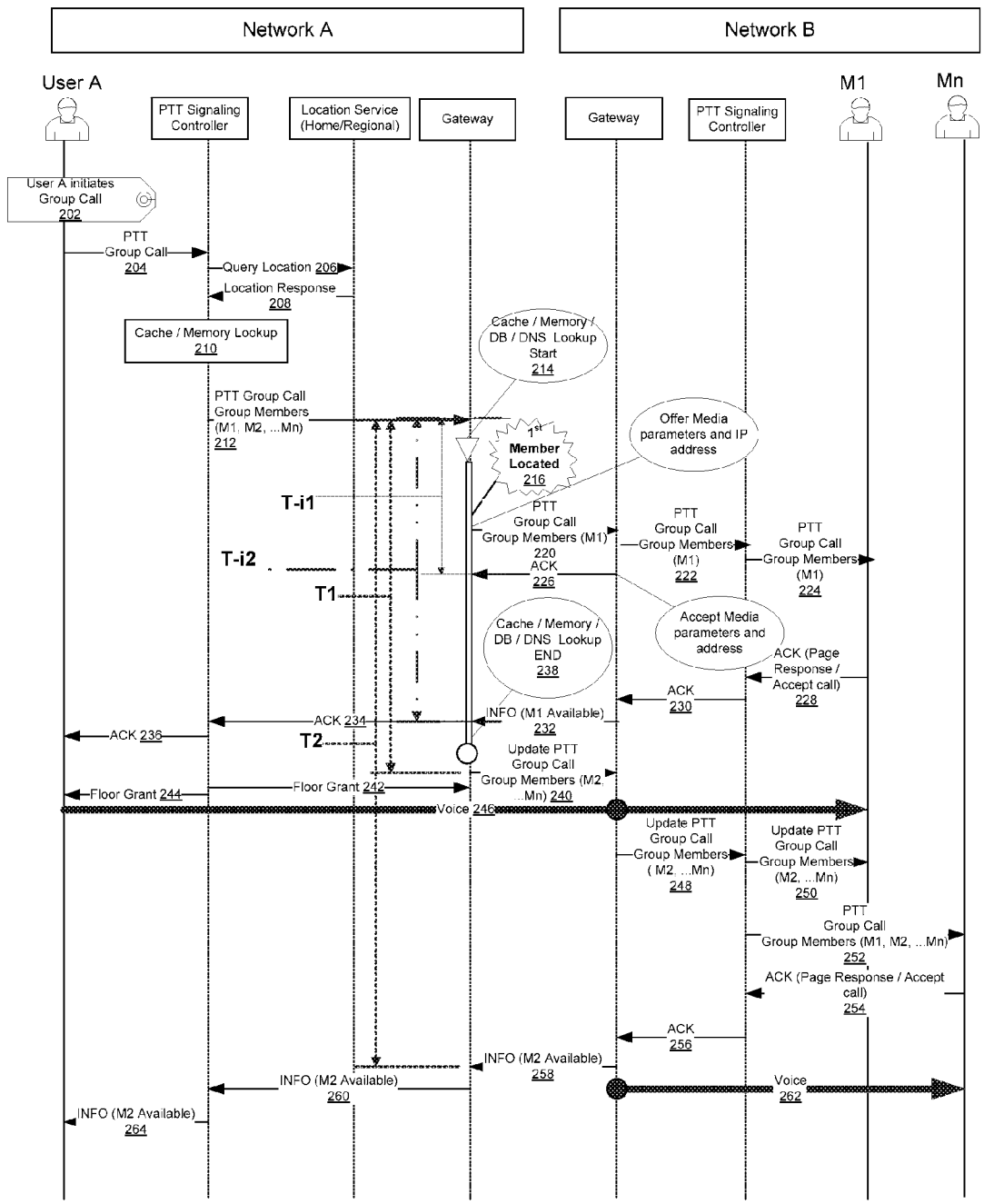

FIG. 1 is a call flow diagram of a conventional push-to-talk group call between two networks; and FIG. 2 is a call flow diagram of a push-to-talk group call between two networks in accordance with exemplary embodiments of the present invention.

DETAILED DESCRIPTION OF THE PREFERRED EMBODIMENTS

FIG. 1 is a call flow diagram of a conventional push-to-talk group call between two networks. The call flow of FIGS. 1 and 2 involve a user A with an associated mobile station (herein referred to as the initiating mobile station) attempting to establish a group call with a number of destination mobile stations located in network B. Each network includes a PTT signaling controller that handles call-related signaling. Each network also includes a gateway for communication between the networks, and network A also includes a location service, which can be, for example, a home location register or a regional location register.

When user A decides to initiate a group call (step 102), user A's mobile station sends a PTT group call request to PTT signaling controller (step 104). The group call request can include a single identifier that is associated with a group of mobile stations and/or a number of identifiers, each associated with one or more mobile stations. The PTT signaling controller then sends a query location message to a home or regional location service (step 106), which provides a location response (step 108). The PTT signaling controller uses the information in the location response to perform a lookup using a local cache or memory (step 110).

Based on the lookup, the PTT signaling controller determines that all of the members of the group call are located in network B, and accordingly the PTT signaling controller sends a PTT group call request, identifying the group members, to a gateway of network A. The gateway of network A performs a lookup to determine in which network the members of the PTT group call are located (step 114). This lookup can involve a local cache, memory, database or a domain name server (DNS) lookup. After all of the group members identified in the PTT group call request have their locations identified by the gateway of network A (step 116), the gateway of network A sends a PTT group call request to the network in which the destination mobile stations are located (step 120). The group call request includes media parameters and Internet Protocol (IP) addresses for the PTT group call.

The gateway of network B receives the PTT group call request from the gateway of network A and sends a PTT group call request to the PTT signaling controller of network B (step 122), which in turn forwards the request to mobile stations whose members are identified in the group call request (steps 124 and 126). One or more of the destination mobile stations sends an acknowledgement, accepting the call, to the PTT signaling controller of network B (step 128), which is then forwarded to the gateway of network B (step 130). The gateway of network B accepts the parameters and addresses by sending an acknowledgement to the gateway of network A (step 134). This acknowledgement is forwarded to the initiating mobile station by way of the PTT signaling controller (steps 136 and 138), and the PTT signaling controller sends floor grant messages to the initiating mobile station (step 140) and to the destination mobile stations (steps 142-148). The initiating mobile station, having been floor, can then send voice to one or more of the destination mobile stations (step 150).

FIG. 2 is a call flow diagram of a push-to-talk group call between two networks in accordance with exemplary embodiments of the present invention. The call flow steps 202-212 of FIG. 2 are similar to that of steps 102-112 of FIG. 1, and accordingly these steps will not be described again in detail. Turning now to the location lookup performed in step 214, in the call flow of FIG. 2, once the first member of the group call is located (step 216), media parameters and an IP address are offered in a PTT group call request message sent from the gateway of network A to the gateway of network B (step 220). The gateway of network B then sends the PTT group call request to the PTT signaling controller of network B (step 222), which then sends the request to the first destination mobile station (step 224). After sending the group call request, but prior to receiving an acknowledgement from the first destination mobile station, the gateway of network B sends an acknowledgement to the gateway of network A accepting the media parameters and IP address (step 226).

When the first destination mobile station accepts the PTT call, an acknowledgement message is sent to PTT signaling controller (step 228), which then forwards the acknowledgement to the gateway of network B (step 230). The gateway of network B then sends a message to the gateway of network A informing that gateway that one of the destination mobile stations is available (step 232). The gateway of network A sends an acknowledgement message to the PTT signaling controller of network A (step 234), which forwards the acknowledgement to the initiating mobile station (step 236).

Once the gateway of network A has identified the location of all of the destination mobile stations identified in the PTT group call request (step 238) and has received an acknowledgement that the first located member is available (step 232) then the gateway of network A sends an updated PTT group call request identifying the remaining group members to the gateway of network B (step 240). Around approximately the same time, the PTT signaling controller of network A sends a floor grant message to the gateway of network A (step 242) and to the initiating mobile station (step 244), both of which indicate that the floor is granted to the initiating mobile station. The initiating mobile station can then send voice to the first destination mobile station (step 246). Although FIG. 2 illustrates the floor grant occurring after the other destination mobile stations are located, this can occur before the other destination mobile stations are located.

While the call between the initiating mobile station and the first destination is ongoing, the gateway of network B sends the updated PTT group call request to the PTT signaling controller of network B (step 248), which then sends the update request to the first destination mobile station (step 250), and a group call request to the remaining group members (step 252). When one of the remaining group members sends an acknowledgement accepting the call (step 254), the PTT signaling controller of network B sends the acknowledgement message to the gateway of network B (step 256), which then notifies the gateway of network A that the second group member is available for participating on the call (step 258).

The gateway of network A then informs the PTT signaling controller of network A that the second destination mobile station is now available for the call (step 260). At approximately the same time, the gateway of network B, which is already receiving the voice information from the initiating mobile station for the first located mobile station, will then also forward the voice information to the other destination mobile stations that have accepted the call (step 262). At some time thereafter, the PTT signaling controller of network A informs the initiating mobile station that the second destination mobile station is now available and has joined the call (step 264).

The mobile stations, PTT signaling controller, location service and gateways described above in connection with FIGS. 1 and 2 can perform the various acts described above using application specific integrated circuits (ASICs), field programmable gate arrays (FPGAs) and/or a microprocessor executing computer-readable code embodied on a computer-readable medium. The computer-readable medium can be any type of memory, such as random access memory (RAM), read-only memory (ROM), a compact disk, hard disk, flash memory and/or the like. Thus, logic for performing any of the acts described above can be realized using any of the aforementioned hardware and/or software.

Comparing the call flows of FIGS. 1 and 2, it can be seen that the systems and methods of the present invention provide a much quicker call setup compared to the conventional techniques. This quicker call setup is due to the inventors' recognition that the conventional technique of locating all destination mobile stations prior to establishing a PTT group call introduces additional latency in the call setup process. For example, the present invention accepts the media parameters and IP address (step 226) within a time of T-i1 within the period of time of T1, whereas the conventional techniques do not perform such an acceptance until the time period of T2, which is beyond the time period of T1. Moreover, the present invention allows the PTT call to be established between the initiating mobile station and at least one of the destination mobile stations shortly after the initiation of the location lookup by the gateway of network A, whereas in the conventional technique this call is not established for a significant period of time as considered for a PTT group call. Further, this time difference of the group call setup will be much larger if the group call involves hundreds or more destination mobile stations.

Although exemplary embodiments of the present invention have been described in connection with all of the destination mobile stations being located in the same network, the present invention can also be employed where one or more of the destination mobile stations are located in different networks, including one or more being located in the same network as the initiating mobile station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for establishing a call, the method comprising the acts of:
    receiving, from an originating mobile station, a group call request that identifies a first and second destination mobile station;
    determining a location of the first destination mobile station; and
    establishing the call between the originating mobile station and the first destination mobile station, wherein the call is established prior to a determination of a location of the second destination mobile station.

2. The method of claim 1, further comprising the act of:
    determining a location of the second destination mobile station; and
    joining the second destination mobile station into the call between the originating mobile station and the first destination mobile station.

3. The method of claim 1, wherein the call is a push-to-talk call.

4. The method of claim 1, wherein the originating mobile station is located in a first network and the first and second destination mobile stations are located in a second network.

5. The method of claim 4, wherein the first and second networks are coupled by first and second gateways, and the first gateway determines the location of the first destination mobile station.

6. The method of claim 5, wherein the first gateway determines the location of the first destination mobile station using information stored in a memory of the gateway or in a domain name server (DNS).

7. The method of claim 4, wherein the call is established after receiving an acknowledgement from the first destination mobile station.

8. The method of claim 7, wherein the second gateway sends an acknowledgment to the first gateway prior to receipt of the acknowledgment by the second gateway from first destination mobile station.

9. The method of claim 8, wherein the acknowledgement sent by the second gateway indicates acceptance of media parameters for the call.

10. The method of claim 4, wherein the first and second networks are operated by different network operators.

11. The method of claim 1, wherein the group call request identifies a third destination mobile station that is located in a third network.

12. A method for establishing a call between an originating mobile station supported by a first network and at least a first destination mobile station supported by a second network, the method comprising the acts of:
    receiving, by a gateway of the second network, a group call request that identifies the first destination mobile station and includes media parameters for a group call;
    sending, by the gateway of the second network, the group call request to the first destination mobile station;
    sending, by the gateway of the second network to a gateway of the first network, an acknowledgement message accepting the call; and
    receiving, by the gateway of the second network from the first destination mobile station, an acknowledgement message accepting the call, wherein the acknowledgement message is received from the first destination mobile station subsequent to the sending of the acknowledgement message from the gateway of the second network to the first gateway of the first network,
    wherein a call is established between the originating mobile station and the first destination mobile station.

13. The method of claim 12, wherein the group call request identifies a second destination mobile station and the call is established between the originating mobile station and the first destination mobile station prior to a determination of a location of the second destination mobile station.

14. The method of claim 13, further comprising the acts of:
    determining a location of the first destination mobile station;
    determining a location of the second destination mobile station; and
    joining the second destination mobile station into the call between the originating mobile station and the first destination mobile station.

15. A system comprising:
    a gateway located in a second network, the gateway is coupled to a gateway of a first network, wherein the gateway of the second network includes a computer-readable medium including computer-executable code to perform the acts of
        receiving a group call request that identifies a first destination mobile station and includes media parameters for a group call;
        sending the group call request to the first destination mobile station;
        sending an acknowledgement message accepting the call to the gateway of the first network; and
        receiving, from the first destination mobile station, an acknowledgement message accepting the call, wherein the acknowledgement message is received from the first destination mobile station subsequent to the sending of the acknowledgement message to the gateway of the first network,
    wherein a call is established between an originating mobile station and the first destination mobile station.

16. The system of claim 15, wherein the group call request identifies a second destination mobile station and the call is established between the originating mobile station and the first destination mobile station prior to a determination of a location of the second destination mobile station.

17. The system of claim 16, wherein a location of the first and second destination mobile stations and the second destination mobile station is joined into the call between the originating mobile station and the first destination mobile station.

* * * * *